Aug. 7, 1928.

G. C. DAVIS 1,680,015

RUNNING BOARD BOLT

Filed Aug. 31, 1925

Inventor
George C. Davis
By Blackmore, Spencer & Fluke
Attorney

Patented Aug. 7, 1928.

1,680,015

UNITED STATES PATENT OFFICE.

GEORGE C. DAVIS, OF LANSING, MICHIGAN, ASSIGNOR TO GENERAL MOTORS CORPORATION, OF DETROIT, MICHIGAN, A CORPORATION OF DELAWARE.

RUNNINGBOARD BOLT.

Application filed August 31, 1925. Serial No. 53,565.

This invention has to do with headed fasteners and particularly with bolts of the type used in the assembly of automobiles to secure the wooden running boards upon the chassis-carried brackets.

Heretofore it has been common practice to use for this purpose bolts having the upper portions of their shanks made square to prevent their rotation. In practice it has been found that these squared portions have been ineffectual in preventing rotation of the bolts when the nuts are screwed thereon, particularly when there are burrs upon the threads of the bolts or when the threads have become filled with paint, sawdust or the like, making it difficult to thread the nuts upon the bolts.

My improved bolt is provided with integral prongs which bite into the wood or other relatively soft material with which it is used. Rotation of the bolt while the nut is being drawn up is thus effectively prevented.

In the drawings, Figure 1 is a view partly in section, showing my improved fastener in position;

Figure 1:
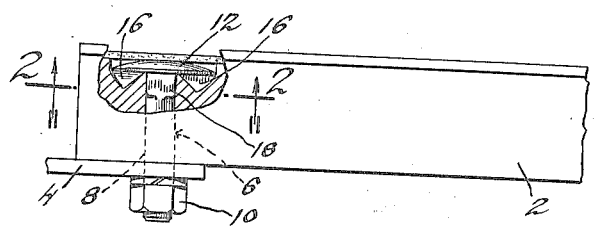

Reference character 2 indicates a portion of an automobile running board, while reference character 4 indicates a portion of a bracket which serves to support it from the chassis.

My improved fastener is indicated generally by reference character 6 and comprises a head 12 and shank 8 threaded to receive a nut 10. The head of the bolt is provided with notches 14 formed by cutting into the head and pressing down the material at one side of the cut to form prongs 16. These prongs bite into the wood and serve to prevent rotation of the bolt while the nut is being drawn up thereon.

Figure 2:
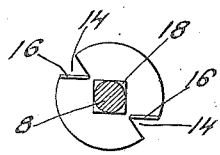
Figure 2 is a section on line 2—2 of Figure 1.
Figure 3:
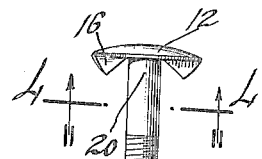
Figure 3 is a side elevation of a modified form of bolt.
Figure 4:
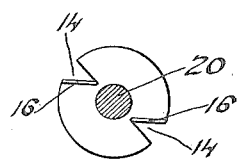
Figure 4 is a section on line 4—4 of Figure 3.

While in the form shown in Figures 1 and 2 the upper portion of the shank of the bolt is shown squared, as at 18, in the form shown in Figures 3 and 4 the shanks are of circular cross sections as shown at 20, the prongs alone being relied upon to hold the bolt against rotation.

What I claim and desire to protect by Letters Patent is:

A lag bolt, including a solid shank, adapted to be projected through a body, a plate-like integral head on said solid shank, having a flat undersurface, adapted to abut said body, said head having a single radial incision extending from the periphery thereof into proximity with the solid shank, and a dependent ear adapted to bite into said body as the plate-like head is forced into abutment therewith, said ear consisting of the material of the plate-like head to one side of the radial incision which is bent downwardly on a divergent line into substantially the direction of the longitudinal axis of the solid shank, and being of triangular shape, the apex thereof comprising the point of intersection of the peripheral edge of the plate-like head with the edge at the radial incision.

In testimony whereof I affix my signature.

GEO. C. DAVIS.